United States Patent
Tuukkanen et al.

(10) Patent No.: US 9,210,547 B2
(45) Date of Patent: Dec. 8, 2015

(54) MOBILE DRIVING CONDITION DETECTION

(71) Applicant: HERE Global B.V., Veldhoven (NL)

(72) Inventors: Marko Tapio Tuukkanen, Berlin (DE); Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 3 days.

(21) Appl. No.: 13/954,474

(22) Filed: Jul. 30, 2013

(65) Prior Publication Data
US 2015/0038123 A1    Feb. 5, 2015

(51) Int. Cl.
| | |
|---|---|
| H04M 3/42 | (2006.01) |
| H04W 4/02 | (2009.01) |
| H04W 4/04 | (2009.01) |
| H04W 40/20 | (2009.01) |
| B60K 28/06 | (2006.01) |
| B60W 40/08 | (2012.01) |
| H04W 4/16 | (2009.01) |

(52) U.S. Cl.
CPC .............. *H04W 4/025* (2013.01); *B60K 28/063* (2013.01); *B60W 40/08* (2013.01); *H04W 4/04* (2013.01); *H04W 4/16* (2013.01); *H04W 40/20* (2013.01); *B60W 2040/0836* (2013.01)

(58) Field of Classification Search
CPC ......... H04W 4/16; H04W 4/025; H04W 4/04; H04W 40/20; B60W 2040/0836; B60W 40/08; B60K 28/063
USPC ............ 455/414.1; 340/426.11; 701/1, 5, 316
See application file for complete search history.

(56) References Cited

U.S. PATENT DOCUMENTS

| | | | | |
|---|---|---|---|---|
| 6,697,732 | B1* | 2/2004 | Gotfried | 701/516 |
| RE38,870 | E  * | 11/2005 | Hall | 701/301 |
| 7,286,040 | B2* | 10/2007 | Karabinis | 340/10.1 |
| 7,962,342 | B1* | 6/2011 | Coughlan et al. | 704/270.1 |
| 8,267,215 | B2 | 9/2012 | Ozaki | |
| 8,280,436 | B2* | 10/2012 | Harris, Jr. | 455/556.1 |
| 2003/0036823 | A1* | 2/2003 | Mahvi | 701/1 |
| 2004/0083031 | A1* | 4/2004 | Okezie | 701/1 |
| 2004/0153421 | A1* | 8/2004 | Robinson | 705/75 |
| 2006/0028556 | A1* | 2/2006 | Bunn et al. | 348/211.99 |
| 2006/0244461 | A1* | 11/2006 | Song et al. | 324/500 |
| 2007/0105072 | A1* | 5/2007 | Koljonen | 434/112 |
| 2007/0118426 | A1* | 5/2007 | Barnes, Jr. | 705/14 |
| 2009/0300525 | A1* | 12/2009 | Jolliff et al. | 715/764 |
| 2010/0012417 | A1* | 1/2010 | Walter et al. | 180/272 |
| 2010/0029270 | A1* | 2/2010 | Kiddie et al. | 455/428 |

(Continued)

FOREIGN PATENT DOCUMENTS

JP         2009-029373         2/2009

OTHER PUBLICATIONS

European Search Report cited in EP14174626.3, mailed May 21, 2015.

*Primary Examiner* — Charles Shedrick

(74) *Attorney, Agent, or Firm* — Lempia Summerfield Katz LLC

(57) ABSTRACT

In one embodiment, user data is analyzed to determine whether a user may be in an impaired condition or demonstrating impairment related activity. The user data may reflect the location of the user or the behavior of the user. In response to the impairment related activity, a contact database is accessed for one or more other users. A communication session is initiated with the one or more other users. A poll of the one or more uses results in a sobriety assessment or a driving condition assessment of the potentially impaired user.

18 Claims, 9 Drawing Sheets

(56) References Cited

U.S. PATENT DOCUMENTS

| | | |
|---|---|---|
| 2010/0312431 A1* | 12/2010 | Kaschner .................... 701/33 |
| 2011/0084820 A1* | 4/2011 | Walter et al. ............ 340/426.24 |
| 2011/0161100 A1* | 6/2011 | Peak et al. ................... 705/2 |
| 2011/0195699 A1* | 8/2011 | Tadayon et al. ............. 455/418 |
| 2011/0304465 A1 | 12/2011 | Boult et al. |
| 2011/0309932 A1* | 12/2011 | Arringdale et al. ...... 340/539.14 |
| 2012/0028680 A1* | 2/2012 | Breed ....................... 455/556.1 |
| 2012/0075094 A1* | 3/2012 | Keays ..................... 340/539.12 |
| 2012/0220232 A1* | 8/2012 | Okano et al. ............... 455/41.2 |
| 2012/0268259 A1* | 10/2012 | Igel et al. ................ 340/426.11 |
| 2012/0295595 A1* | 11/2012 | Gibori et al. .............. 455/414.1 |
| 2013/0135109 A1* | 5/2013 | Sharon ........................ 340/576 |
| 2014/0247343 A1* | 9/2014 | Chen ............................ 348/135 |

\* cited by examiner

MOBILE DRIVING CONDITION DETECTION

FIELD

The following disclosure relates to a sobriety or driving condition check for a user of a mobile device.

BACKGROUND

According to the National Highway Traffic Safety Administration, approximately 34,000 fatalities per year and 275,000 other injuries result from operating motor vehicles under the influence of alcohol in the United States. In addition, about 1.5 million arrests are made for the operation of motor vehicles under the influence of alcohol in the United States in violation of state laws. In some cases, an alcohol detection device (e.g., breathalyzer) is installed in the automobile of a driver convicted under these laws. The driver may be required to periodically breathe into the alcohol detection device to authorize use of the automobile.

However, the alcohol detection devices are costly and unreliable. Offenders may circumvent the alcohol detection devices by allowing another person to breathe into the alcohol detection device. Alternatively, electronic alterations could disable the alcohol detection device. Finally, the alcohol detection devices are usually limited only to the automobiles of those who have already been convicted of driving under the influence.

SUMMARY

In one embodiment, user data is analyzed to determine whether a user may be in an impaired condition or demonstrating impairment related activity. The user data may reflect the location of the user or the behavior of the user. In response to the impairment related activity, a contact database is accessed for one or more other users. A communication session is initiated with the one or more other users. A poll or another type of interaction with the one or more uses results in a sobriety assessment or driving condition assessment of the potentially impaired user.

BRIEF DESCRIPTION OF THE DRAWINGS

Exemplary embodiments of the present invention are described herein with reference to the following drawings.

DETAILED DESCRIPTION

Normally, people rely on their own self-monitoring or feedback from peers to determine sobriety or suitability for driving. Driving under the influence of alcohol is not considered commonly acceptable and many campaigns against impaired driving are based on friends and family preventing the friend of family member from driving under influence. Often, the keys away are physically taken away from the intoxicated driver. However many times at the moment when the intoxicated driver enters the vehicle they might not be near friends or family members, thus the use of the automobile cannot be prevented. The following embodiments enhance this process by tracking users to identify impairment related activities when feedback to determine sobriety is recommended. The following embodiments also expand the network of peers from which feedback can be obtained through communication with a mobile device to confirm the sobriety of a user. In one example, impairment related activity is detected, and in response, the other users are contacted to "sign off on" or confirm the sobriety of the original user. The confirmation of sobriety may be made through a telephone call or another type of communication.

Figure 1:
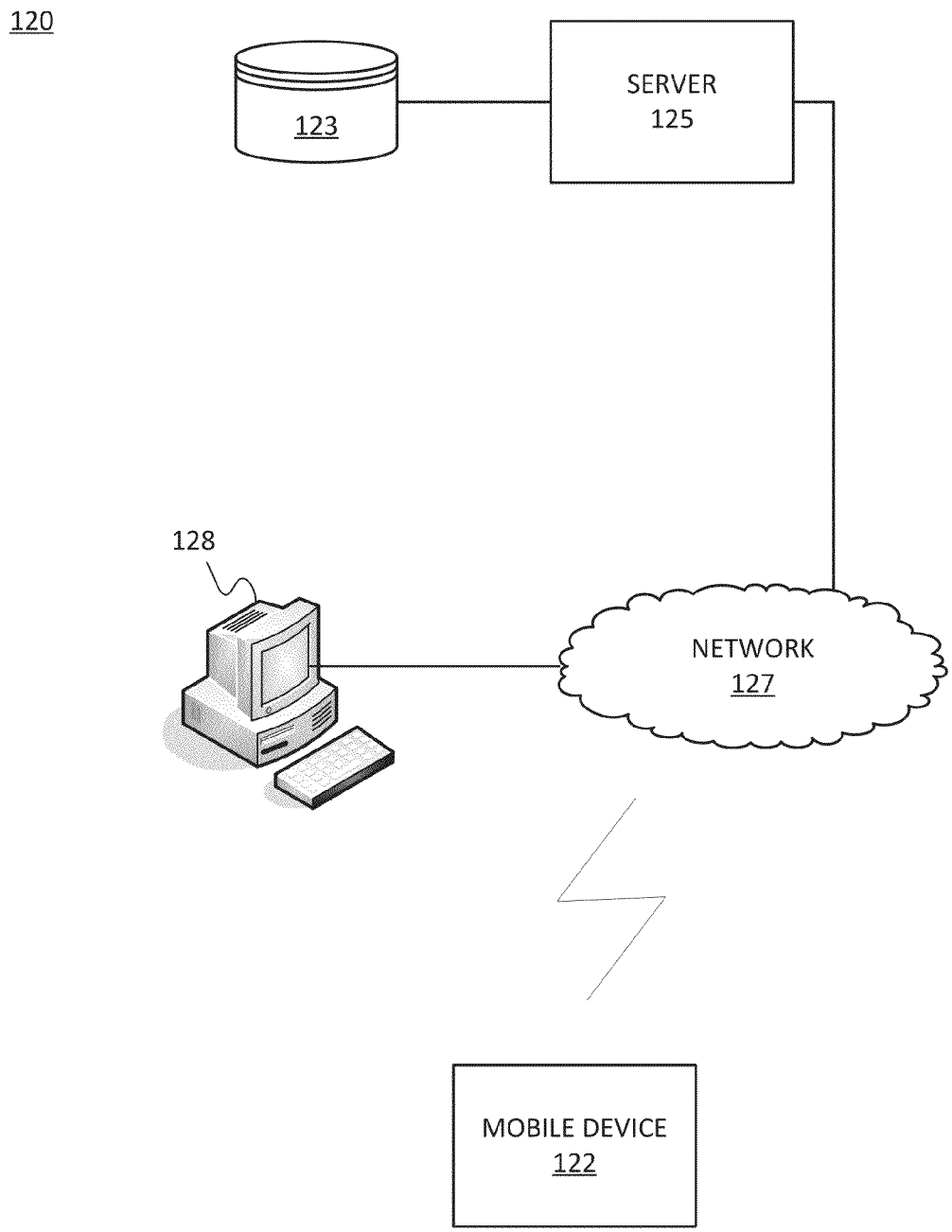
FIG. 1 illustrates a system for confirming the sobriety of a user.

FIG. 1 illustrates a system 120 for confirming the sobriety of a user. The system includes 120 a server 125, a database 123, a mobile device 122, and a network 127. Additional, different, or fewer components may be provided. In one example, a workstation 128 receives user inputs to configure the system 120.

The database 123 may be a geographic database including roadways, walkways, road segments, businesses, and points of interests. The locations may be defined by one or more coordinate pairs (e.g., latitude and longitude). The database 123 may designate some businesses or points of interest as related to impairment or associated with a risk of impairment. Locations that are related to impairment may include restaurants, bars, taverns, bowling alleys, billiard parlors, concert venues, breweries, wineries, sporting event locations, or any place that serves alcohol.

The mobile device 122 is configured to generate location data according to the geographic position of the mobile device 122. The mobile device 122 may include a global positioning system (GPS) or another type of position circuitry. The location data is compared to locations related to impairment. When the location data indicates activity near one or more location related to impairment, the location data indicates impairment related activity. The mobile device 122 is configured to analyze the impairment related activity. In one example, a radius is defined around the locations related to impairment. When the mobile device 122 is within the radius for a specific amount of time, the mobile device 122 is flagged as potentially impaired.

Various precautions may be applied in response to the potentially impaired flag. For example, a message may be presented to the user of the mobile device 122. In another example, an automobile associated with the user is disabled. The mobile device 122 may be a navigation system installed in the automobile and connected to the ignition or computer of the automobile. The mobile device 122 may be a mobile phone that communicates with a navigation system in the automobile directly or through the server 125.

In order to enable the automobile, the user may be required to perform a sobriety confirmation. In one example, the sobriety confirmation includes telephone calls to one or more other users. The other users speak to the user of the automobile and make a determination of sobriety based on speech patterns and audible cues. For example, the mobile device 122 or server 125 is configured to access a contact database in response to identification of the impairment related activity and initiate a communication session with at least one other user accessed from the contact database. The other users provide sobriety feedback to the server 125 or the mobile device 122. If a predetermined number of the other users report that the user of the mobile device 122 is sober enough to drive, data indicative of a sobriety assessment or a friend sign off is generated. In response to the sobriety assessment or friend sign off, the automobile is enabled or started.

In another example, the user is presented with a test by the mobile device 122 as a preliminary test to detect impairment related activity, a sobriety confirmation in lieu of the friend sign off, or a secondary test to confirm or refute the results of the friend sign off. The test on the mobile device 122 may be any combination of a math quiz, a reflex test, a memory test, and a questionnaire. The questionnaire may include information such as gender, age, weight, a number of drinks, and a time frame from which a sobriety estimate may be calculated. If the test indicates that the driver is not impaired, the automobile is enabled or started.

The system 120 for confirming the sobriety of a user may be combined with a system for monitoring and maximizing the commute of a user. The mobile device 122 may track the user during normal daily activity. From the daily activity, a current route may be selected taking into consideration real time factors such as traffic, weather, events, or public transportation delays. In addition, the mobile device 122 may recognize deviations from the daily activity and factor those deviations into the analysis of the impairment related activity.

Figure 2:
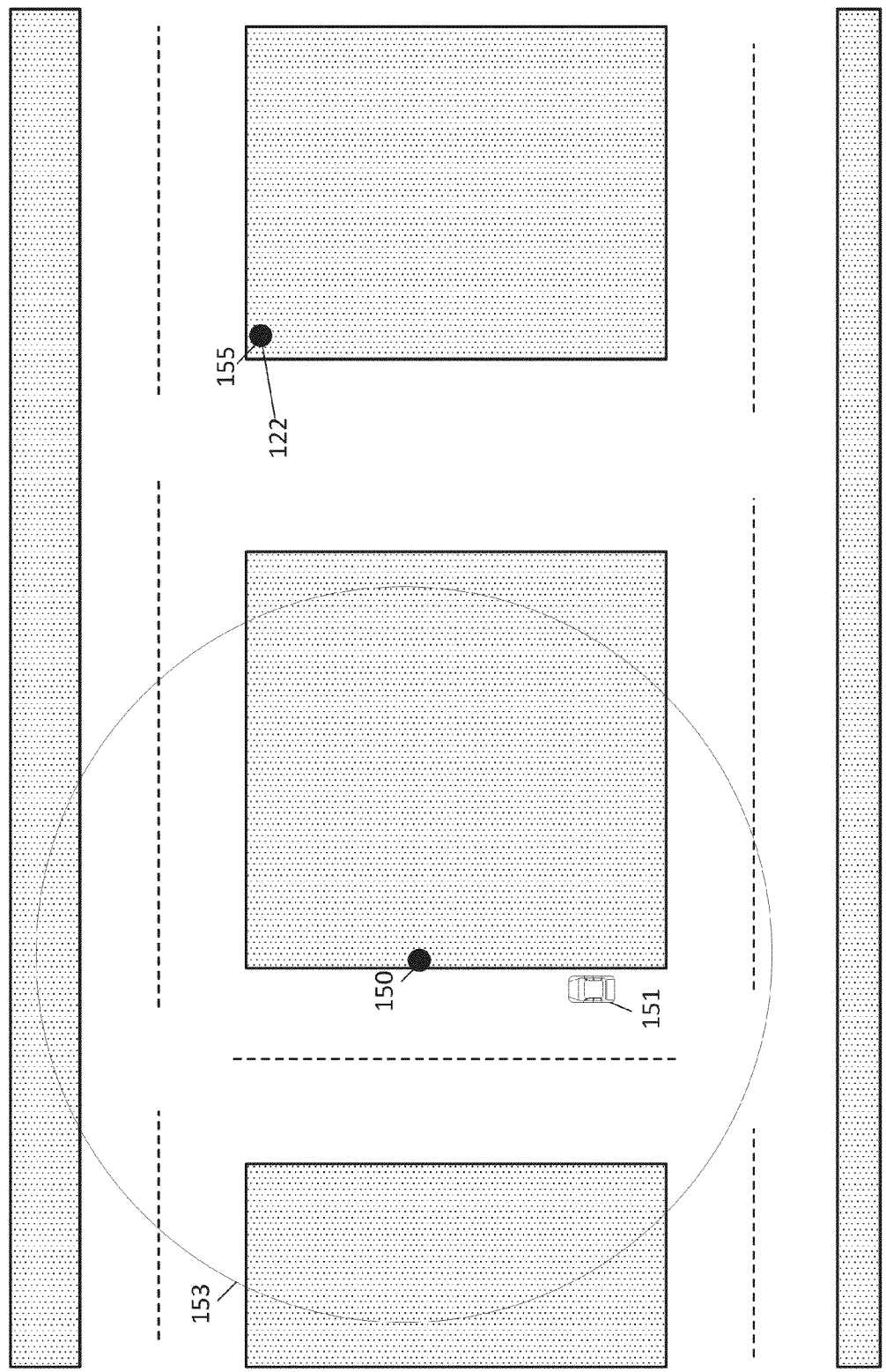
FIG. 2 illustrates a map including the mobile device of FIG. 1.

FIG. 2 illustrates a map including an automobile 151 associated with the mobile device 122 of FIG. 1. In one example, impairment related activity is based on the position of the mobile device 122 or the automobile 151. For example, parking near a bar or in the parking lot of a bar is impairment related activity. A circle 153 illustrates a distance range from a bar 150. When the automobile 151 comes to a stop inside of the circle, a timer is started. The amount of time that the automobile 151 is parked near the bar is a general indication of how many drinks have been consumed by a driver of the vehicle. The mobile device 122 or the server 125 may compare the elapsed time from the timer to a threshold time. When the elapsed time exceeds the threshold time, the mobile device 122 or the server 125 identifies an impairment related activity. Examples for the threshold time include 1 hour, 2 hours, or another configurable amount of time.

In another example, the position of the mobile device 122 is tracked into the location 153, which is associated with impairment. When the mobile device 122 is inside of the location 153 for more than a predetermined amount of time, the mobile device 122 or the server 125 identifies an impairment related activity.

In another example, the position of the mobile device 122 is tracked across multiple alcohol related locations. For example, impairment related activity may be identified when the mobile device 122 travels from location 153 to location 155. Traveling from one alcohol related location to another may be indicative of bar hopping. This additional requirement for identification of impairment related activity may help to prevent the false positive that could result from visiting restaurant that happens to serve alcohol. People do not often travel from restaurant to restaurant to eat.

Figure 3:
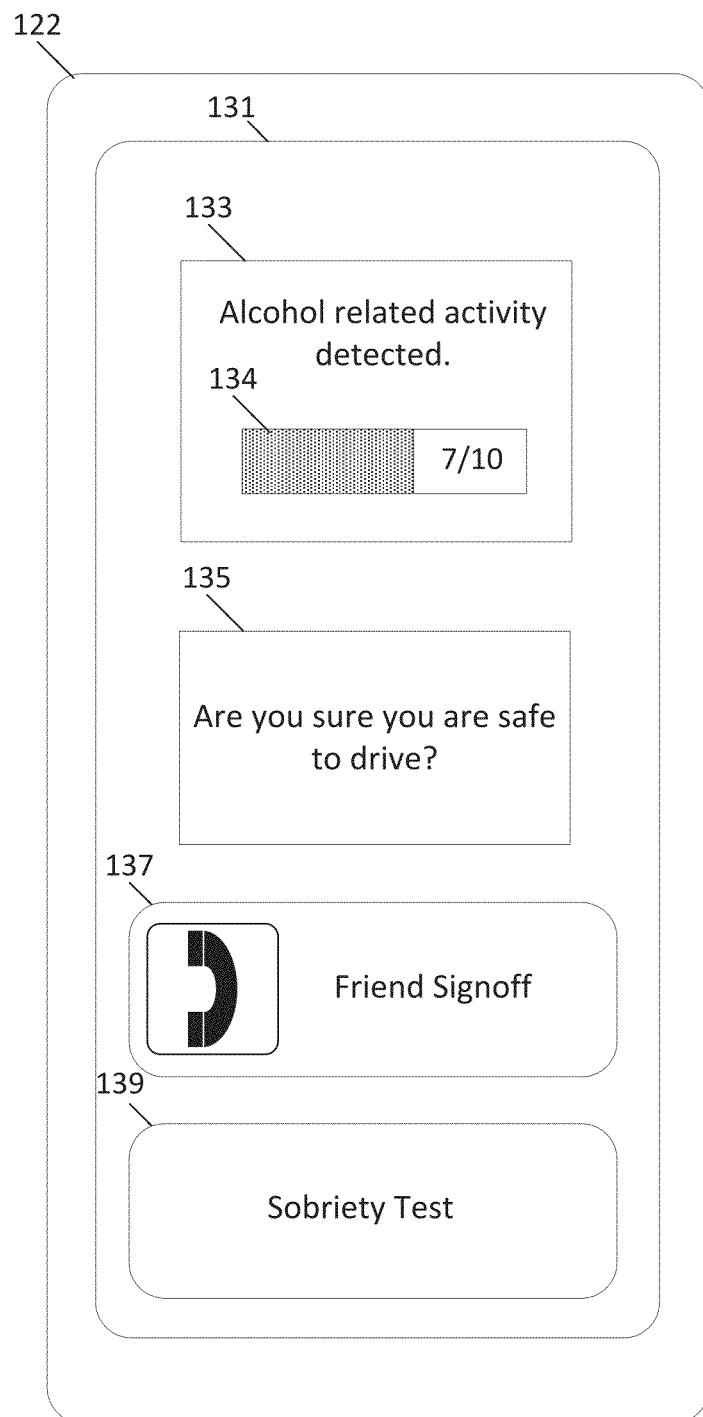
FIG. 3 illustrates an interface of the mobile device of FIG. 1.

FIG. 3 illustrates an interface 131 of the mobile device 122 of FIG. 1. The interface 131 may include one or more warning messages. The warning messages may indicate a level of the detected impairment related activity. For example, the warning message 133 states "Alcohol related activity detected" and includes a status level bar 134. The status level bar 134 may represent a degree of the detected impairment related activity. For example, the mobile device 122 may calculate an alcohol related activity score or a sobriety score. The alcohol related activity score may be directly proportional to the number of alcohol related locations visited by the mobile device 122 and/or the duration of time spent at each of the alcohol related locations and/or inversely proportional to the proximity or distance to the alcohol related locations by the mobile device 122.

In addition, the alcohol related activity score may depend on the time of day or the day of week. For example, a person in a restaurant at midnight on Saturday is more likely to be consuming alcohol than on Monday at noon. In one example, the alcohol related activity score is increased in the evenings and on the weekend and reduced during normal work hours (e.g., Monday through Friday from 8 A.M. to 5 P.M.). In another example, a person leaving a business when the bars close very late (e.g., 2 AM) may be assigned a higher alcohol related activity score. The timing may be established based on user provided drinking patterns to account for users that tend to drink at certain times or in certain situations. In addition, an event schedule may be used to weight the alcohol related activity score. The event schedule may include football games, soccer matches, concerts, or any event that likely has alcohol available. The event schedule may also be supplemented by a list of attendees (e.g., from a social network service), the respective alcohol related activity scores of the attendees may impact each other. For example, if many of the attendees of an event attended by the user have high alcohol related activity scores, then the alcohol related activity score of the user is increased. Other inputs for the alcohol related activity score may include the user's past scores, the user's friends' scores, and the type of vehicle.

The warning message may vary according to the alcohol related activity score. For example, when the alcohol related activity score is above a first threshold but below a second threshold the mobile device 122 may display a subtle reminder to the user. For example, warning message 123 reminds the user "Are you sure you are safe to drive?" When the alcohol related activity score is above the second threshold, the mobile device 122 may display a direct reminder for the user, such as "Impairment activity detected—your vehicle has been disabled."

The warning message may also vary according to location. If the user's position indicates that the user may be headed to another bar, the warning message may include "I see you've arrived at another bar" or "Maybe it is time to go home."

The interface 131 may also provide options for confirming sobriety to the user. For example, a friend signoff option 137 or the sobriety test option 139 may be selected when the alcohol related activity score is above a threshold in order to confirm the sobriety of the user. The sobriety test option 139 may be selected in addition or as an alternative to the friend signoff option 137.

Figure 4:
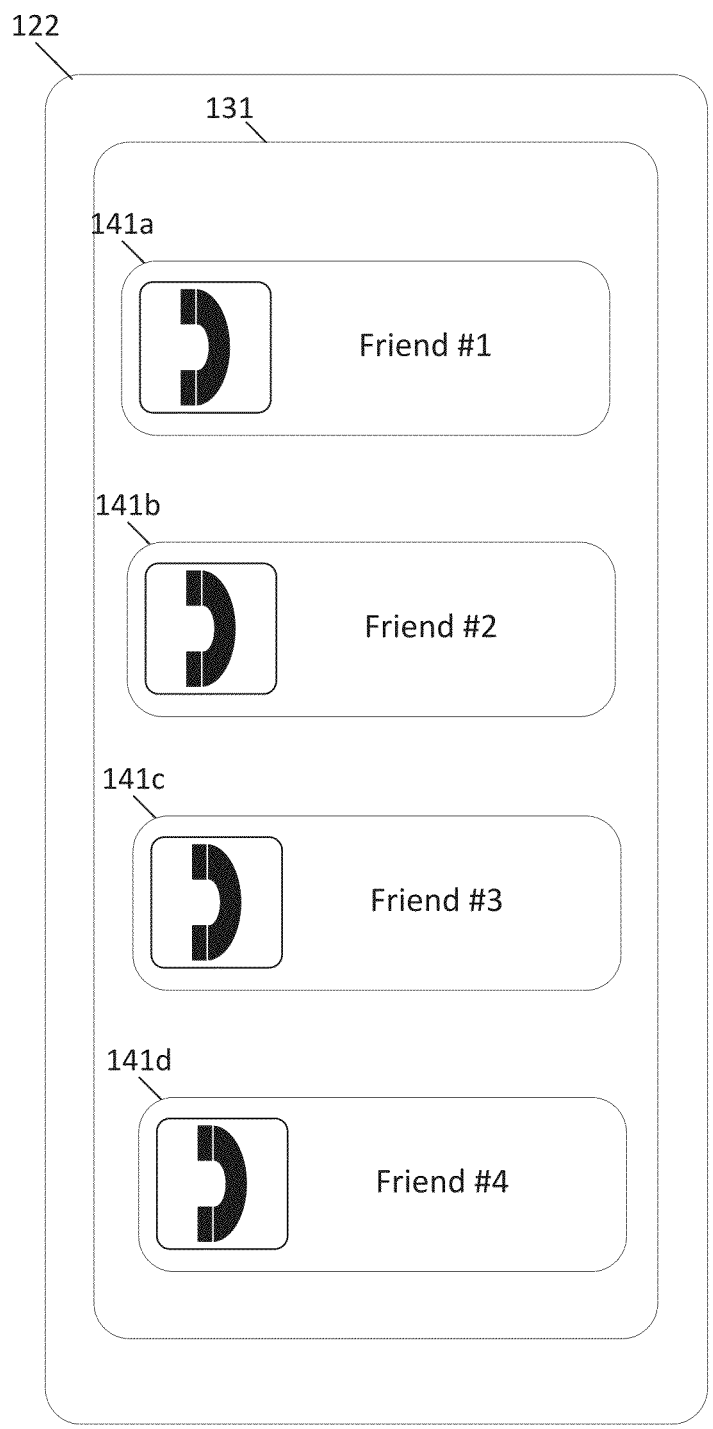
FIG. 4 illustrates another example interface of the mobile device of FIG. 1.

FIG. 4 illustrates another example interface 131 of the mobile device 122 of FIG. 1. The interface 131 may include details of the friend signoff option 137. For example, multiple contacts are listed at friend options 141*a-d*. The mobile device 122 is configured to initiate calls with one or more of the listed friends. If a connection is made, the listed friends communicate with the user and assess the user's sobriety. After the call, the listed friends may be presented with a graphical display or a recording that requests an assessment of the sobriety of the user. The sobriety assessment may be binary (e.g., yes or no) or the sobriety assessment may be on a scale (e.g., 1 to 10). Alternatively, the sobriety assessment may be made from a series of inquiries. The inquires may describe factors such as whether the user's speech was slurred, whether there were long pauses in the user's speech, whether the user sounded impaired, or other factors.

The contacts for the friend signoff may be selected in a variety of techniques. In one example, the user selects one or more contacts from the contact list in the mobile device 122 to be contacted for the friend signoff. The mobile device 122 may attempt a phone call with each of the one or more contacts selected from the contact list. The phone calls may be made in succession.

In another technique, the contacts for the friend signoff are selected based on user activity. For example, the most active contact or set of contacts may be selected from the mobile device 122. The activity may be the number of phone calls, duration of phone calls, number of text messages, number of emails, or a combination thereof.

In another technique, the contacts for the friend signoff are selected based on the locations of the contacts. The contacts may also be associated with mobile devices, and the positions of those mobile devices are received by the server 125. The contacts that are closest to the mobile device 122 may be selected. It is likely that the contacts or friends that are near the user or have recently spent time with the user are best aware of the user's condition to drive. The contacts that have recently moved, indicating that they are awake, may be selected.

In another technique, the contacts for the friend signoff are selected based on a social networking service. The contacts may be selected according to social distance. The social distance may be a function of an amount of communication within the social networking service, a number of contacts in common, or a length of time since the social networking connection was created. Examples of the social network service include Facebook, My Space, Linked In, or another social network service.

In another technique, the friends selected for the friend sign off may be registered. For example, the friend signoff and sobriety assessment may be incorporated into a specialized mobile application. In this example, the contact database is made up of registered users of the specialized mobile application. In another example, the server 125 may include a list of registered friends for the contact.

In one example, multiple contacts are connected to the mobile device 122 in a conference call. The multiple contacts and the user of the mobile device 122 communicate in the conference call and the contacts assess the sobriety of the user. During the conference call, the contacts can vote and/or change their votes regarding the sobriety of the user. In one example, the user must convince all of the multiple contacts to simultaneously vote for sobriety in order to receive a positive sobriety assessment and/or authorization to enable the vehicle of the user. The number of votes required to confirm sobriety may depend on the type of contact. For example, two family members may be sufficient to confirm the user is safe to drive but five social networking contacts are sufficient to confirm the user is safe to drive. The multiple contacts may also be weighted depending on the type of contact. For example, a parent assessing a child may be assigned a higher weight than a friend that is the same age as the user.

Other types of user behavior may be monitored in order to identify impairment related activity. In one example, text messages are monitored for typographical errors or content. People tend to make typographical errors under the influence of alcohol. The mobile device 122 may count the number of text messages that include a misspelled word or trigger the autocorrect function. As a baseline, the mobile device 122 may keep a running average of the frequency of typographic errors made by the user of the mobile device 122. When the number of typographical errors exceeds the baseline by a threshold amount, the mobile device 122 identifies an impairment related activity.

In another example, the mobile device 122 may monitor the content of text messages or emails for keywords that are indicative of impairment related activities. Example keywords include but are not limited to bar, drink, beer, wine, or the name of designated alcohol related locations in the database 123.

In another example, the mobile device 122 is configured to identify impairment related activity based on activity on a social network service. For example, when a user checks in or is tagged at an alcohol related location, the mobile device 122 designates the user as having impairment related activity. In another example, the mobile device 122 is configured to identify impairment related activity based on walking patterns of the user. Erratic walking patterns or stumbling may indicate impairment.

In another example, the mobile device 122 is configured to identify impairment related activity based on a network connection. For example, the mobile device 122 is configured to monitor for a connection made with a wireless network. Certain wireless networks may be associated with alcohol related locations. For example, the database 123 may list the internet protocol (IP) addresses or service set identification (SSID) for wireless networks accessible from alcohol related locations.

In another example, the mobile device 122 is configured to identify impairment related activity based on purchases made by the user. The purchases may be identified from a mobile payment system on the mobile device 122. The mobile payment system may utilize near field communication. The mobile device 122 may monitor the vendor name or the item names from purchases made by the mobile payment system. Alternatively, the purchases may be identified from a credit card usage accessible from an application running on the mobile device 122. The purchases may also be identified from coupon usage, membership identification, or discount cards. Any of which may be received at server 125 or monitored by an application on the mobile device 122.

In another example, the mobile device 122 is configured to measure physical behavior of the user. For example, the mobile device 122 may include a pressure sensor. Impaired people may tend to squeeze the mobile device 122 harder. The mobile device 122 may be configured to measure pressure data and compare the data to a pressure threshold. When the pressure threshold is exceeded by the user, the alcohol related activity score is increased.

Figure 5:
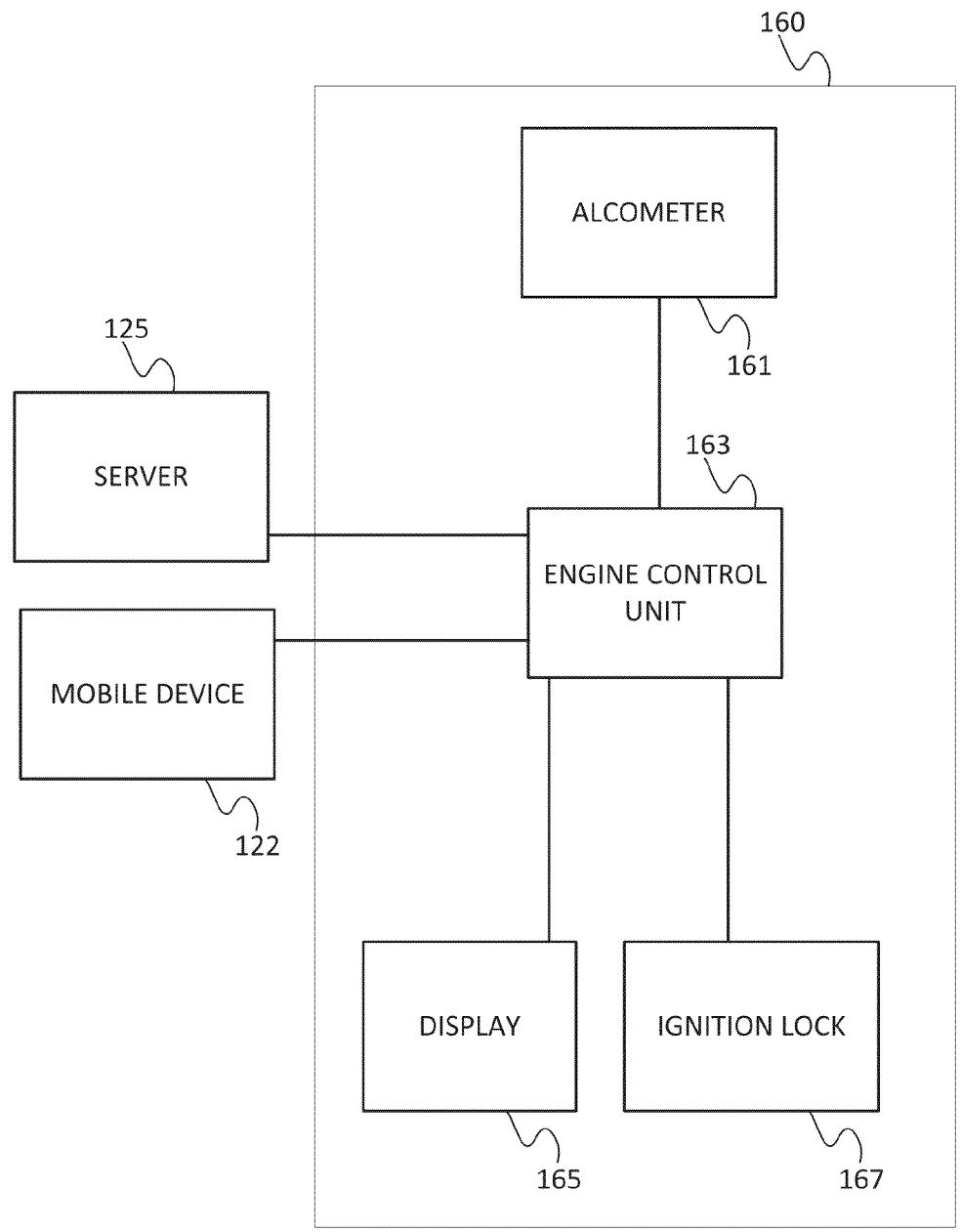
FIG. 5 illustrates another example system for confirming the sobriety of a user.

FIG. 5 illustrates another example vehicle system 160 for confirming the sobriety of a user. The vehicle system 160 includes an engine control unit 163, a display 165, and an ignition lock 167. In some examples, the vehicle system 160 may include an alcometer 161. An alcometer is a device for detecting for the presence of alcohol. A breathalyzer is an example of an alcometer. The vehicle system 160 may be, temporarily or permanently, coupled with the mobile device 122, the server 125, or both. The mobile device 122 may be a vehicle navigation device or a mobile phone.

The vehicle system 160 may be connected to a wireless or cellular network and in communication with the server 125. In addition or in the alternative, the vehicle system 160 may be connected to in communication with the mobile device through a wireless network, a cellular network, Bluetooth, near field communication, infrared, or another communication method. The interaction between the mobile device 122 and the vehicle system 160 may be based on the proximity of the mobile device 122 to the vehicle system 160. That is, the vehicle may be disabled or enabled in response to the mobile device 122 approaching the vehicle.

Figure 6:
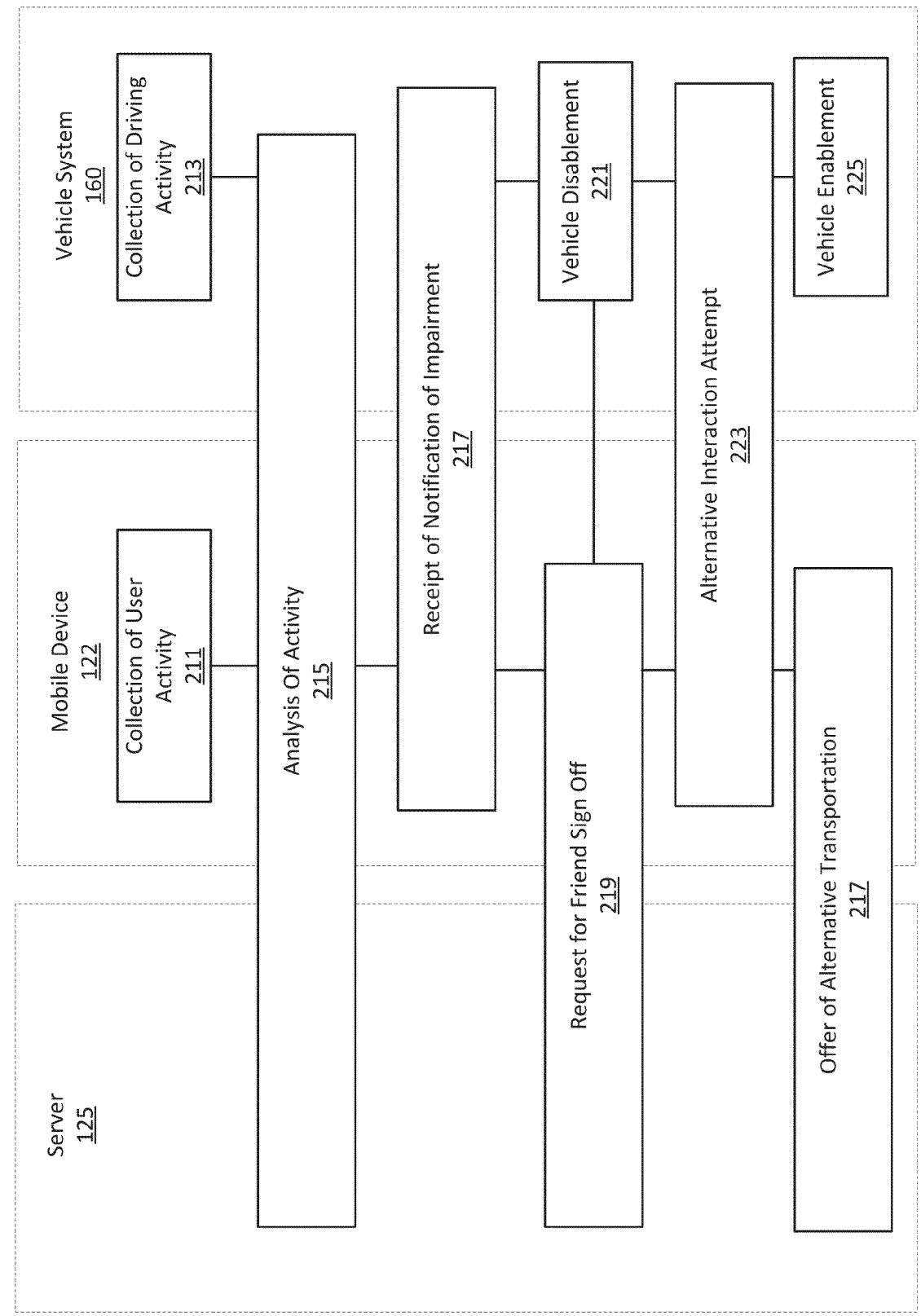
FIG. 6 illustrates an example flowchart for confirming the sobriety of a user.

FIG. 6 illustrates an example flow for confirming the sobriety of a user. Each horizontal level in the flow shows a stage of the flow. However, stages may be performed in another order and/or omitted. Vertically, the operations of the server 125, the mobile device 122, and the vehicle 160 are illustrates by dotted line boxes which overlap stages to indicate which devices may perform each stage.

An initial stage is data collection. The data collection may be a collection of user activity 211 from the mobile device 122 and/or a collection of driving activity 213 from the vehicle system 160. The data may be measured with sensors, such as a global positioning system (GPS) or another satellite based positioning system. The sensors may include inertial sensors (e.g., accelerometer and/or gyroscopes). The sensors may include a magnetometer.

In the vehicle system 160, the data may be received from a controller area network (CAN) bus, which is a message based protocol to allow microcontrollers to commute within a vehicle. The data may be received from an on-board diagnostic system (e.g., OBD-II). The on-board diagnostic system includes a set of sensors related to automotive systems (e.g., fuel efficiency, unsafe driving, engine speeds, vehicle speeds, fuel level, and other parameters.)

The subsequent stage is the analysis of the activity 215, which may include the user activity, the driving activity, or both. The analysis may be performed by the mobile device 122, the server 125 or the vehicle system 160. The analysis includes comparing location data or driving behavior to impairment related patterns.

The subsequent stage includes receipt of notification of impairment 217 at either the mobile device 122 or the vehicle system 160. In response to the notification of impairment 217, a warning message is generated that indicates the sobriety of the user who was monitored in the initial stage. The warning message may be a textual message displayed by the mobile device 122 or the display 165.

The subsequent stage includes a request for friend sign off 219. Either the server 125 or the mobile device 122 accesses a contact database of the user who was monitored in the initial stage. One or more other users are selected from the contact database. Communication with the one or more other users is carried out by the mobile device 122. The communication 122 is initiated by the mobile device 122 or initiated through a message received from the server 125. A sobriety assessment for the monitored user is received from the other users.

The subsequent stage includes vehicle disablement 221 by the vehicle system 160. The vehicle disablement may be made in response to a command message in response to the warning message based on the impairment related activity analysis or in response to the sobriety assessment. The command message may be generated by the engine control unit 163. When the vehicle is disabled by the warning message, the vehicle may be re-enabled based on a positive result from the sobriety assessment. When the vehicle is not disabled by the warning message, the vehicle may be disabled by a negative result from the sobriety assessment.

The vehicle disablement 221 may be carried out by the ignition lock 167. In response to the command message to disable the vehicle generated by the engine control unit 163, the ignition lock 167 prevents the vehicle from being started or turns off the engine. Alternatively, the ignition lock 167 may ground a starter wire for the engine.

The subsequent stage includes an alternative interaction attempt 223. The alternative interaction attempt 223 may be made in response a negative sobriety assessment from the friend sign off or in response to the vehicle disablement 221. The alternative interaction attempt 223 may take various forms. The alternative interaction attempt 223 may be another sobriety test presented to the user through the mobile device 122 or the display 165. Examples of a sobriety test include a touch screen connect the dots, a quick recall of facts (e.g., phone numbers, addresses), a reflex test, sequence test, or another option. The sobriety test may be a balance test, walking test, eye tracking, eye responsiveness, or hand eye coordination test that measures the movement of the user using the accelerometer of the mobile device 122. For example, the sobriety test could be a hover test (e.g., keep your finger at 1 cm above the screen for 20 seconds). The hovering finger may be detected by an infrared sensor or a structured light sensor installed in the mobile device 122. In another example, the sobriety test could ask that the user hold an arm out horizontal for an amount of time. The position of the arm and/or steadiness of the arm may be measured using the accelerometer of the mobile device 122 or another accelerometer in a wrist attachment connected to the mobile device 122.

The alternative interaction attempt 223 may be performed by the alcometer 163. The alcometer may be a breathalyzer or another type of ignition interlock device that includes a sensor (e.g., electrochemical device) configured to detect alcohol. The electrochemical device may generate an electrical current in response to a chemical oxidation reaction at a catalytic electrode in response to the existence of alcohol. The current may be a function of the amount of alcohol. The current may be transmitted to the engine control unit 163, which determines whether to disable or enable the vehicle based on the current.

One or more of the alternative interaction attempts 223 may be performed. Based on the alternative interaction attempts 223, either the mobile device 122 or the vehicle system 160 determines whether the vehicle should be enabled. Vehicle enablement 225 may involve reversing the disablement steps described previously. If the vehicle is not enabled, the mobile device 122 or display 165 may provide an offer of alternative transportation 217. The mobile device 122 may initiate a call to a taxi company. If the impaired driver selects an alternative mode of transport (e.g., taxi), the mobile device 122 may order the taxi for the driver without further interaction required from the driver. The location of the mobile device 122 may be delivered to the taxi company. The mobile device 122 or the display 165 may present alternative transportation options (e.g., buses, trains). If the impaired driver selects a public mode of transport (e.g., train or bus), the directions to the nearest stop and/or station and schedules (e.g., departure times, length of travel, connections) may be presented to the driver through the mobile device 122.

The mobile device 122 may select a contact from the contact database based on proximity, availability for the sobriety assessment, or social distance for the user to call for a ride. In another example, the mobile device 122 may initiate a call to the police department to investigate whether the user is attempting to drive under the influence.

Figure 7:
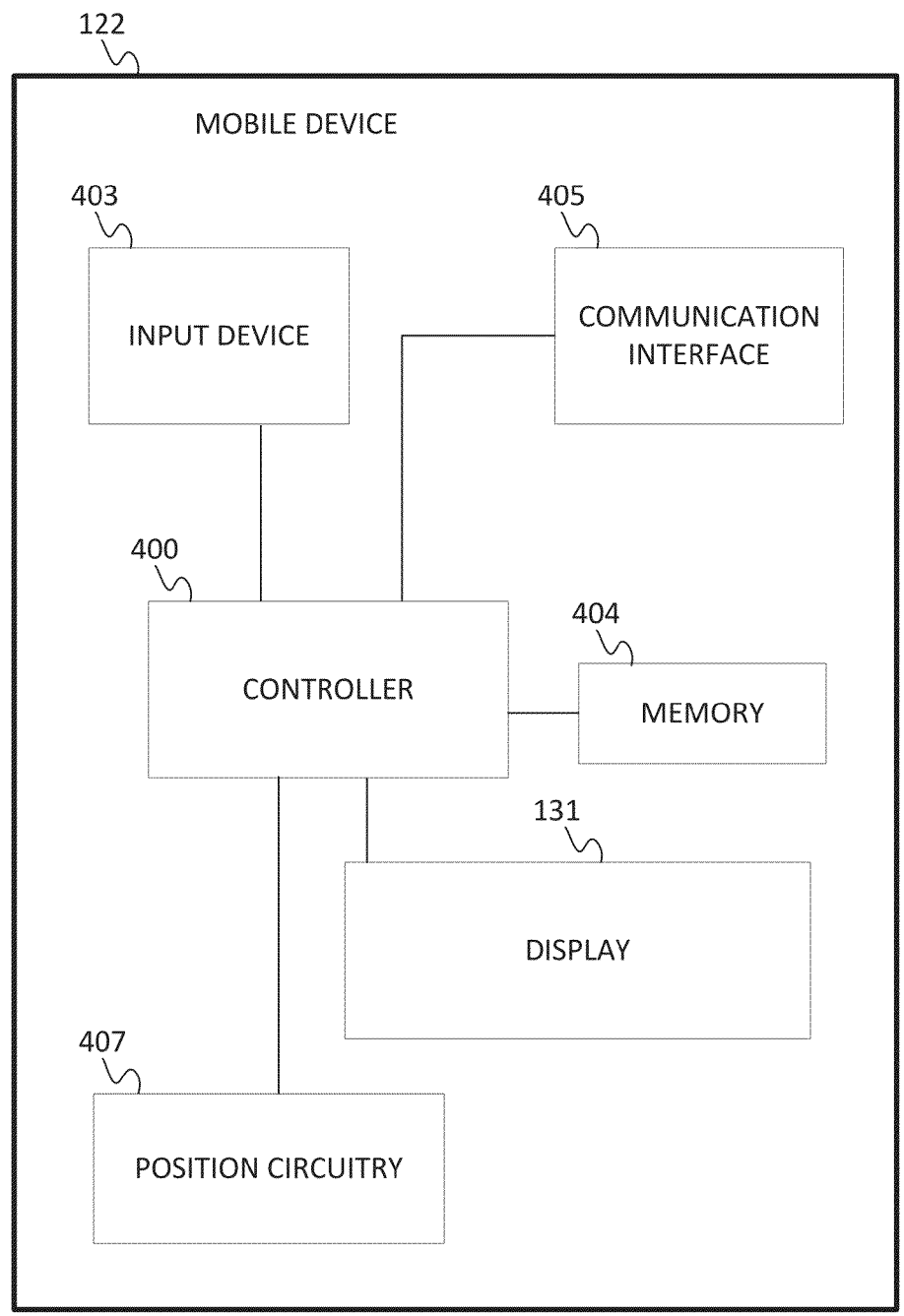
FIG. 7 illustrates an example of the mobile device of FIG. 1.

FIG. 7 illustrates an exemplary mobile device of the system of FIG. 1. The mobile device 122 includes a controller 400, a memory 404, an input device 403, a communication interface 405, position circuitry 407, and a display 131. Additional, fewer, or different components may be included. For example, a camera may be included for video communication sessions between the mobile device user and the other users.

The position circuitry 407 is configured to collect behavior data. The behavior data may be location data from GPS sensor of a mobile phone or an in-car navigation system. The behavior data may be movement patterns collected by an accelerometer, gyroscope, or magnetic sensor of a mobile phone. The behavior data may be driving pattern data (e.g., acceleration, braking, turning, or other parameters) collected by an in-car diagnostic device.

Figure 8:
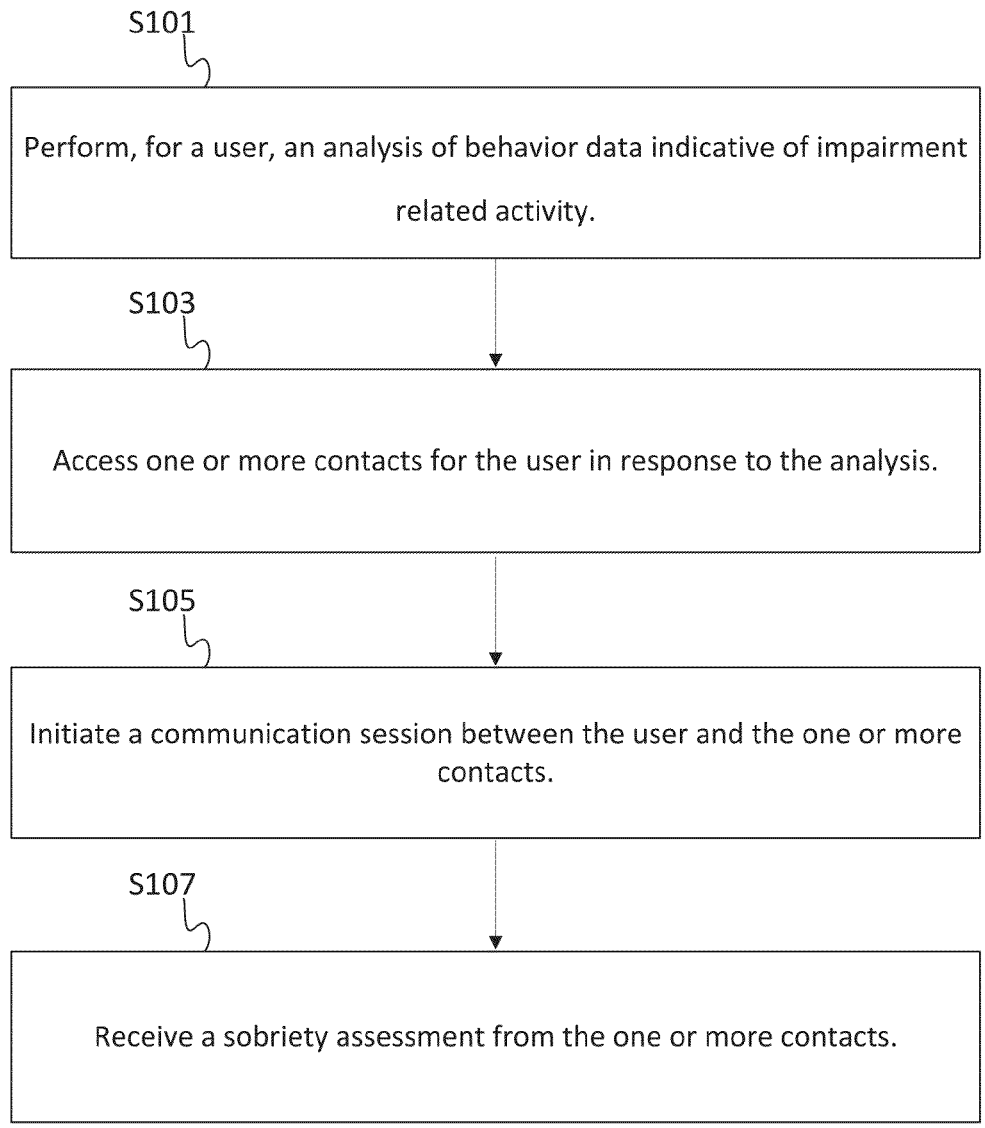
FIG. 8 illustrates an example flowchart for confirming the sobriety of a user.

FIG. 8 illustrates an example flowchart for confirming the sobriety of a user. Additional, fewer, or different acts may be provided and performed simultaneously or in a different order. The acts of FIG. 8 are discussed below with reference to the mobile device of FIG. 7, but other devices may be used.

At act S101, the controller 400 is configured to perform an analysis of behavior data for a user. The user may be the registered user of the mobile device 122. The analysis may compare the location data, movement patterns, or driving patterns to data indicative of impairment related activity.

At act S103, the controller 400 is configured to access one or more contacts for the user in response to the analysis from the memory 404. The contacts are people identified by name, telephone number, or IP address. The contacts may be downloaded to the memory 404 from another source such as a social network service (e.g., server, website, database) or another mobile device (e.g., mobile phone contact list). Contact information for the one or more contacts may be presented to the user of the mobile device 122 via the display 131.

The one or more contacts may be selected based on a supervisory relationship between the user and the one or more contacts. For example, the user's parents, spouse, or other family may also be selected as the one or more contacts. In another example, the user's parole officer or Alcoholics Anonymous sponsor may be selected as the one or more contacts. The one or more contacts may be selected based on their current proximity to the mobile device 122. For example, contacts that are near the user may make an in-person assessment of sobriety.

At act S105, the controller 400 or the communication interface 405 is configured to initiate a communication session between the user and the one or more contacts. The communication session may be a cellular phone call, a voice over IP phone call, a video chat phone call, or another type of communication session. During the communication session, the one or more contacts are requested to assess the sobriety of the user. The request may take the form of a text message or another message on display 131 during or after the communication session. The request may be made by the user by asking the one or more contacts to call or text another number. The request may be made by a recording during the communication session.

At acts S107, in response to the request, the controller 400 receives a sobriety assessment from the one or more contacts. The controller 400 is configured to compare the sobriety assessment to a threshold level. The sobriety assessment may be a score based on a confidence level included in the sobriety assessment. For example, the one or more contacts may rate how impaired they believe the user is. The sobriety score may be a function of multiple responses from the contacts.

The threshold level may be a baseline level such that any negative sobriety assessment exceeds the threshold level. The threshold level may be a function of past behavior of the user such as driving under the influence arrests or convictions or automobile accidents.

The controller 400 is configured to generate a vehicle disablement control message when the sobriety assessment exceeds the threshold level. The vehicle disablement control message is transmitted to the vehicle (e.g., engine control unit 163, ignition lock 167) in order to disable starting the vehicle or cut power to the vehicle. The controller 400 is configured to present a sobriety confirmation alternative to the user. The sobriety confirmation alternative may be a breathalyzer or a physical impairment test involving balance, response time, or memory.

The input device 403 may be one or more buttons, keypad, keyboard, mouse, stylist pen, trackball, rocker switch, touch pad, voice recognition circuit, or other device or component for inputting data to the mobile device 122. The input device 403 and the display 131 may be combined as a touch screen, which may be capacitive or resistive. The display 131 may be a liquid crystal display (LCD) panel, light emitting diode (LED) screen, thin film transistor screen, or another type of display. The input device 403 may be used to select contacts for the friend signoff. The input device 403 may be used to provide sobriety assessment for other users.

The positioning circuitry 407 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 407 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

Figure 9:
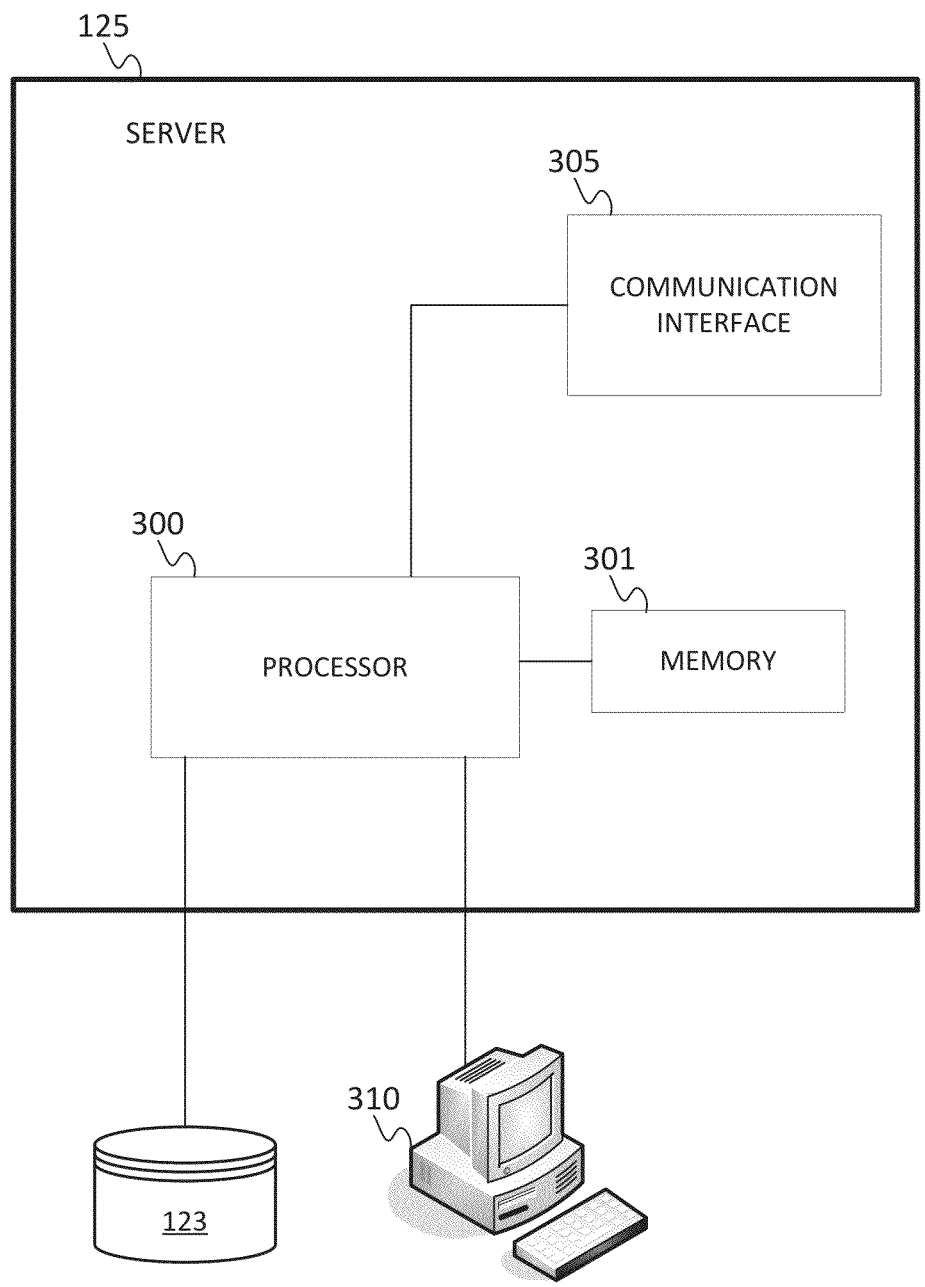
FIG. 9 illustrates an example of the network device of FIG. 1.

FIG. 9 illustrates an example server 125 of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122.

The processor 300 may be configured to analyze behavior data or user data according to the above embodiments and transmit the results of the analysis to the mobile device 122. The processor 300 may be configured to select the contacts for the sobriety assessment from the database 123. The processor 300 may be configured to identify the impairment related locations from the database 123. The processor 300 may be configured to compare the sobriety assessment to a threshold and send the disablement message directly to the vehicle. In other words, the mobile device 122 may be omitted from the system.

The optional workstation 128 is a general purpose computer including programming specialized for the disclosed embodiments. For example, the workstation 128 may receive user inputs for defining the impairment related locations, the sobriety thresholds, and the algorithm for calculating the sobriety score. The workstation 128 includes at least a memory, a processor, and a communication interface.

The server 125, the workstation 128, and the mobile devices 122 are coupled with the network 127. The phrase "coupled with" is defined to mean directly connected to or indirectly connected through one or more intermediate components. Such intermediate components may include hardware and/or software-based components.

In addition to the data described above, the database 123 may include store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments 104), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections 106) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The controller 400 and/or processor 300 may include a general processor, digital signal processor, an application specific integrated circuit (ASIC), field programmable gate array (FPGA), analog circuit, digital circuit, combinations thereof, or other now known or later developed processor. The controller 100 and/or processor 300 may be a single device or combinations of devices, such as associated with a network, distributed processing, or cloud computing.

The memory 404 and/or memory 301 may be a volatile memory or a non-volatile memory. The memory 404 and/or memory 301 may include one or more of a read only memory (ROM), random access memory (RAM), a flash memory, an electronic erasable program read only memory (EEPROM), or other type of memory. The memory 404 and/or memory 301 may be removable from the mobile device 122, such as a secure digital (SD) memory card.

The communication interface 405 and/or communication interface 305 may include any operable connection. An operable connection may be one in which signals, physical communications, and/or logical communications may be sent and/or received. An operable connection may include a physical interface, an electrical interface, and/or a data interface. The communication interface 405 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The memory 404 and/or memory 301 may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   generating a warning message indicative of sobriety of a first user at a mobile device;
   accessing a contact database of the first user for a plurality of users;
   initiating a communication session between the mobile device and at least one of the plurality of users;
   receiving a plurality of sobriety assessments for the first user from the plurality of users;
   calculating an assessment score from the plurality of sobriety assessments; and
   comparing the assessment score to a sobriety threshold.

2. The method of claim 1, further comprising:
   analyzing impairment related activity of the first user, wherein the warning message is generated in response to the impairment activity of the first user.

3. The method of claim 1, further comprising:
   calculating a sobriety score based on activity of the first user, wherein the activity includes at least one of a proximity to an alcohol vendor and a duration associated with the alcohol vendor.

4. The method of claim 1, wherein the warning message is configured to disable an automobile.

5. The method of claim 1, further comprising:
   enabling the automobile in response to the sobriety assessment from the second user.

6. The method of claim 1, wherein the warning message states that an unsafe driving condition has been detected.

7. The method of claim 1, wherein the second user is selected based on a social distance as defined by a social networking service or a supervisory relationship stored in the contact database.

8. An apparatus comprising:
   at least one processor; and at least one memory including computer program code for one or more programs, the at least one memory and the computer program code configured to, with the at least one processor, cause the apparatus to perform at least the following,
   analyzing impairment related activity; accessing a contact database based on the impairment related activity; initiating a communication session with a plurality of users accessed from the contact database; and receiving a sobriety assessment from the plurality of users; calculating an assessment score from the sobriety assessment; and comparing the assessment score to a sobriety threshold.

9. The apparatus of claim 8, the computer program code configured to, with the at least one processor, cause the apparatus to perform at least the following,
    generating a command message to disable or enable a vehicle based on the sobriety assessment.

10. The apparatus of claim 8, wherein the impairment related activity includes travel within a proximity of an alcohol related location for a predetermined amount of time.

11. The apparatus of claim 8, the computer program code configured to, with the at least one processor, cause the apparatus to perform at least the following,
    displaying a warning message in response to the impairment related activity or in response to the sobriety assessment.

12. The apparatus of claim 8, wherein the impairment related activity is derived from driving behavior of an on-board diagnostic sensor.

13. The apparatus of claim 8, wherein the impairment related activity includes travel from a first alcohol related location to a second alcohol related location.

14. A non-transitory computer readable medium including instructions that when executed by a processor, instruct the processor to:
    perform an analysis of behavior data for a user, wherein the analysis indicates impairment related activity;
    access a plurality of contacts for the user;
    initiate a communication session between the user and at least one of the plurality of contacts;
    receive a plurality of sobriety assessment from the plurality of contacts;
    calculating an assessment score from the plurality of sobriety assessments; and
    comparing the assessment score to a sobriety threshold.

15. The non-transitory computer readable medium of claim 14, wherein the one or more contacts are selected based on a supervisory relationship between the user and the plurality of contacts.

16. The non-transitory computer readable medium of claim 14, the instructions configured to instruct the processor to:
    compare the sobriety assessment to a threshold level; and
    generate a vehicle disablement control message when the sobriety assessment exceeds the threshold level.

17. The non-transitory computer readable medium of claim 14, the instructions configured to instruct the processor to:
    present a sobriety confirmation alternative to the user, wherein the sobriety confirmation alternative is a breathalyzer or an impairment test.

18. A method comprising:
    generating a warning message indicative of sobriety of a first user at a mobile device;
    accessing a contact database of the first user for a plurality of other users;
    initiating a communication session between the mobile device and at least one of the plurality of other users;
    receiving a plurality of sobriety assessments for the first user from the plurality of other users;
    calculating an assessment score from the plurality of sobriety assessments; and
    comparing the assessment score to a sobriety threshold.

\* \* \* \* \*